（12） United States Patent
Schwarting

(10) Patent No.: US 6,231,008 B1
(45) Date of Patent: May 15, 2001

(54) METHOD AND LIQUID STORAGE TANK FOR MINIMIZING PERMEATION OF LIQUID VAPORS THROUGH A TANK DIVIDING MEMBRANE

(75) Inventor: Walter Schwarting, Oldenburg (DE)

(73) Assignee: DaimlerChrysler Aerospace AG, Ottobrunn (DE)

( * ) Notice: Subject to any disclaimer, the term of this patent is extended or adjusted under 35 U.S.C. 154(b) by 0 days.

(21) Appl. No.: 09/264,750

(22) Filed: Mar. 9, 1999

(30) Foreign Application Priority Data

Mar. 12, 1998 (DE) .............................. 198 10 638

(51) Int. Cl.⁷ ..................................................... B64G 1/22
(52) U.S. Cl. .................. 244/135 R; 244/135 C; 244/158 R; 244/172
(58) Field of Search ........................... 246/158 R, 135 R, 246/135 C, 169, 172; 137/571, 209, 558, 598, 590; 222/1, 54, 386.5, 386, 61, 394, 397, 399, 95

(56) References Cited

U.S. PATENT DOCUMENTS

| | | | |
|---|---|---|---|
| 2,701,441 | * 2/1955 | Mitchell | 244/172 |
| 3,136,121 | * 6/1964 | Barger et al. | 244/172 |
| 3,734,348 | * 5/1973 | White | 222/54 |
| 5,058,834 | * 10/1991 | Hubert | 244/135 C |
| 5,071,093 | * 12/1991 | Perdu | 244/135 R |
| 5,209,115 | * 5/1993 | Bond | 244/135 R |
| 5,954,298 | * 9/1999 | Basuthakur et al. | 244/163 |
| 5,961,074 | * 10/1999 | Dunn | 244/135 R |

* cited by examiner

Primary Examiner—Galen L. Barefoot
(74) Attorney, Agent, or Firm—W. F. Fasse; W. G. Fasse

(57) ABSTRACT

A temperature regulating arrangement (7) at least partially surrounds a fuel or oxidizer storage tank (1). The tank (1) is divided by a polymer membrane (3) into a first partial chamber (2) receiving the fuel (2') therein, and a second partial chamber (4) receiving a gaseous pressure medium (4') therein. The temperature regulating arrangement (7) includes thermal insulation, at least one heater, at least one heat sensor, and a temperature control and regulating unit. By heating the second partial chamber containing the gaseous pressure medium, any fuel vapor permeating through the membrane (3) from the first partial chamber (2) into the second partial chamber (4) is prevented from condensing within the second partial chamber (4). The permeation process is also limited. It is simply necessary to maintain the second partial chamber (4) at a temperature a few degrees Celsius higher than the temperature of the liquid fuel. This tank arrangement is especially suitable for use as a fuel tank or oxidizer tank in a satellite or orbital space station.

17 Claims, 2 Drawing Sheets

METHOD AND LIQUID STORAGE TANK FOR MINIMIZING PERMEATION OF LIQUID VAPORS THROUGH A TANK DIVIDING MEMBRANE

PRIORITY CLAIM

This application is based on and claims the priority under 35 U.S.C. §119 of German Patent Application 198 10 638.6, filed on Mar. 12, 1998, the entire disclosure of which is incorporated herein by reference.

FIELD OF THE INVENTION

The invention relates to a storage container or tank for storing a liquid medium and a gaseous pressure medium separated from each other, whereby the gaseous pressure medium pressurizes and causes the liquid medium to be expelled out of the tank. The invention especially relates to a tank for storing rocket fuels or oxidizers for operating the rocket engines of spacecraft, having at least one separating membrane that separates the interior space of the tank into two partial chambers.

BACKGROUND INFORMATION

In order to adjust the position and the attitude, and to stabilize the orbital motion, of satellites and orbital space stations, such orbital spacecraft typically include rocket thrusters that effectuate the required corrective movements of the spacecraft by relatively small, exactly dosed or controlled thrust impulses. In order to operate these rocket thrusters, the spacecraft carry along appropriate propellant fuels which are usually stored in liquid form in suitable fuel tanks, as well as oxidizers if necessary, which are also stored in suitable tanks. In order to expel the liquid fuel and oxidizer out of the respective tanks in a positive-feed manner, it is generally known to use pressurized gases introduced into the tanks. However, this gives rise to the problem that the gaseous pressure medium can become mixed with the liquid fuel or oxidizer.

In order to allow the gaseous pressure medium to be separated from the liquid fuel or oxidizer, it is also known to separate the interior space of the fuel tank or oxidizer tank into two or more partial chambers by means of one or more flexible membranes. One of these partial chambers on one side of the membrane contains the liquid fuel or oxidizer, while the other partial chamber on the other side of the membrane is filled with and pressurized by the gaseous pressure medium. When the pressure medium is supplied into the respective partial chamber and pressurized, it flexibly deflects the dividing membrane and thus exerts a corresponding supply pressure onto the liquid fuel or oxidizer so as to push the liquid fuel or oxidizer out of the tank.

Especially when the tank is to be used to store a rocket or satellite fuel based on hydrazine, or an oxidizer based on nitrogen tetroxide, the membrane for separating these liquid media from the gaseous pressurizing medium is typically a polymeric membrane, because the polymer materials provide relatively good separation, resistance to chemical attack by the media being stored, and long term durability even under the repeated flexing conditions that come into play.

However, such polymeric membranes cannot completely prevent the permeation of vapors of the liquid fuel or oxidizer through the membrane and into the partial chamber containing the gaseous pressure medium. Such a permeation process is especially caused or enhanced due to the temperature variations that are unavoidable in every technical system of this type, and the influence of these temperature variations on the differing thermal capacities of the liquid fuel or oxidizer relative to the gaseous pressure medium. As a result, the fuel or oxidizer vapors that permeate through the membrane ultimately condense in the partial chamber containing the gaseous pressure medium. The condensed liquid then becomes trapped, so to speak, in the gas-containing partial chamber and cannot be supplied to the associated rocket engine. Since this permeation and condensation can occur continuously, the result can be a considerable loss of useable fuel or oxidizer.

The above described problem of permeation of the fuel or oxidizer through the membrane could be prevented by using a membrane of a non-permeable material rather than the permeable polymers that are conventionally used. The requirements of non-permeability would essentially only be satisfied by providing metal membranes, but such metal membranes are mechanically not suitable for this application because they would suffer metal fatigue and crack formation as a result of the substantial repetitious deformation or deflection processes with a great extent of deformation, to which such dividing membranes are subjected during operation.

SUMMARY OF THE INVENTION

In view of the above, it is an object of the invention to provide a container and particularly a fuel tank or an oxidizer tank of the above mentioned general type that is improved in such a manner so as to reduce or absolutely minimize the permeation and then condensation of fuel or oxidizer vapors into the partial chamber of the tank containing the gaseous pressure medium. It is also an object of the invention to provide a method for minimizing such permeation and condensation of the liquid vapors. The invention further aims to avoid or overcome the disadvantages of the prior art, and to achieve additional advantages, as apparent from the present specification.

The above objects have been achieved in an apparatus according to the invention including a container, at least one membrane separating the inner space of the container into at least a first partial chamber adapted to receive a liquid medium therein and a second partial chamber adapted to receive a gaseous pressure medium therein, and a temperature regulating arrangement provided especially on the side of the tank in which the second partial chamber is formed. The temperature regulating arrangement is adapted to achieve and maintain a second temperature in the second partial chamber containing the gaseous pressure medium that his higher than the first temperature of the liquid medium received in the first partial chamber.

The temperature regulating arrangement, for example, includes thermal insulation around at least a portion of the tank enclosing the second partial chamber containing the gaseous pressure medium and a heater such as an electrical resistance heater, radiant heater or thermoelectric heater, or a heat pipe or other heat conveying device that carries waste heat from any onboard system of the spacecraft into the temperature regulating arrangement. The temperature regulating arrangement may further include at least one temperature sensor of any known type connected to a control circuit, whereby the provision of heat by the heater can be controlled to achieve a precisely controlled or regulated temperature difference between the second temperature of the second partial chamber containing the gaseous pressure medium and the first temperature of the first partial chamber containing the liquid fuel or oxidizer.

The inventive combination of a temperature regulating arrangement and a membrane-divided liquid storage tank serves to constantly maintain the second partial chamber containing the gaseous pressure medium at a temperature that is higher than the temperature of the liquid medium in the first partial chamber. In this manner, the possibility of condensation of fuel or oxidizer vapors in this second partial chamber is reliably prevented. Namely, any fuel or oxidizer vapor that permeates through the membrane and thus comes into the second partial chamber is maintained in a gaseous state until an equilibrium condition is reached, and further permeation through the membrane is thereby prevented. The higher temperature in the second chamber prevents condensation of the fuel or oxidizer vapor and also establishes an advantageous vapor partial pressure equilibrium as will be described further below.

The apparatus according to the invention is especially suitable for use as a fuel tank or an oxidizer tank in a rocket or a satellite or other spacecraft. However, in principle, the inventive liquid storage tank can be used in all situations or all applications in which a liquid medium is to be stored in the tank and then caused to flow out of the tank in a pressure controlled manner by means of a gaseous pressure medium, while reliably preventing or minimizing the loss of liquid by permeation through the membrane.

BRIEF DESCRIPTION OF THE DRAWINGS

In order that the invention may be clearly understood it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
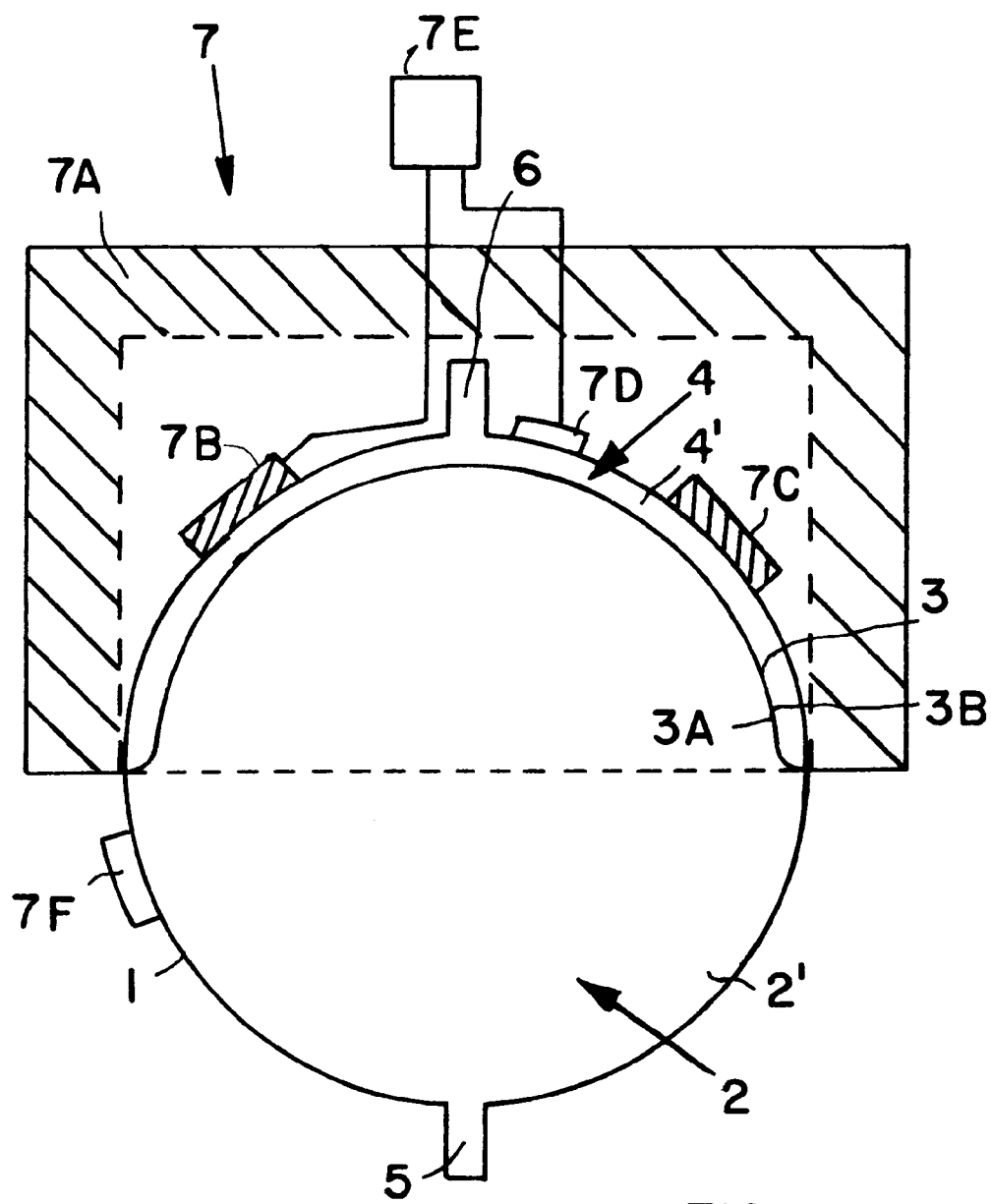
FIG. 1 is a schematic vertical sectional illustration of a liquid storage tank combined with a temperature regulating arrangement according to the invention.

FIG. 1 is a schematic vertical section through an apparatus according to the invention, including a container or tank 1 for containing a liquid medium 2'. In the present embodiment, the container 1 is generally configured as a sphere, but it could alternatively be configured as a vertically oriented cylinder or a horizontally oriented cylinder, for example. The interior space of the container 1 is divided into a first partial chamber 2 for receiving and storing the liquid medium 2' therein, and a second partial chamber 4 for receiving a gaseous pressure medium 4' therein. This separation between the two chambers 2 and 4 is achieved by a generally semi-spherical polymeric membrane 3, which thus provides a separating barrier between the liquid medium 2' in the first chamber 2 and the gaseous pressure medium 4' in the second chamber 4.

The gaseous pressure medium 4' can be introduced into the second chamber 4 and pressurized through a gas filling pipe or pipe stub 6. The gaseous pressure medium 4' thereby flexibly deforms the polymeric membrane 3 and exerts a corresponding pressure on the liquid medium 2' in the first chamber 2. As a result, the liquid medium 2' is pressurized and correspondingly pressed out of the storage container or tank 1 through a liquid outlet pipe or pipe stub 5. Thus, it is apparent that the gaseous pressure medium 4' acts as a pressurizing and conveying medium for positively driving the liquid medium 2' out of the storage container 1.

The inventive apparatus as shown in FIG. 1 further includes a temperature regulating arrangement 7, which at least partially encloses a portion of the exterior of the storage container 1, and particularly that portion of the storage container 1 within which the second chamber 4 for receiving the gaseous pressure medium 4' therein is formed, as especially defined by the equatorial line around the container 1 at which the polymeric membrane 3 is secured and sealed to the wall of the container 1. The temperature regulating arrangement 7, for example, includes a thermal insulation 7A enclosing the relevant portion of the tank 1, and at least one heater as schematically represented by reference numbers 7B and 7C.

The heater or heaters may be any known type of heater, for example an electrical resistance heater, a thermoelectric heater, or any other electrically activated heater 7B, or a heat pipe or heat conducting solid member or any other type of heat conveying device 7C. For example, the heat pipe or other heat conveying heater 7C can introduce heat into the temperature regulating arrangement 7 in a controlled manner from waste heat of onboard electronic or other onboard systems of the spacecraft in which the present apparatus is installed. The heaters may be surface contact mounted on the outside of the wall of the container 1, or may include a heater part reaching into the second partial chamber 4, or may be arranged separated from the container 1 within the inner space of the arrangement 7.

The temperature regulating arrangement 7 further includes at least one of any known type of temperature sensor 7D that is particularly arranged and adapted to sense the temperature of the portion of the container 1 in which the second chamber 4 is formed, and particularly to detect the temperature within the gaseous pressure medium 4' contained within this second chamber 4. The arrangement also includes at least one temperature sensor 7F that is arranged and adapted to sense the temperature of the liquid medium 2' in the first partial chamber 2. The sensors 7D and 7F are merely schematically illustrated in FIG. 1, but may include a probe that extends into the container 1 or may be entirely external of the container 1, for example.

The sensors 7D and 7F as well as the heater 7B and/or heater 7C are each connected for signal transmission to and/or from a temperature control and regulation unit 7E. The temperature control and regulation unit 7E includes any known electronic circuitry and/or electrical elements that are adapted to control the provision of heat by the heaters 7B and/or 7C responsively to the temperature detected by the sensors 7D and 7F as well as control inputs regarding a desired temperature level or temperature difference that is to be maintained. In this manner, the unit 7E properly actuates the heater 7B and/or 7C so as to maintain the desired temperature in the second partial chamber 4' regardless of variations of the external temperature or other variables or in consideration of such variables, or so as to maintain the desired temperature difference between the respective temperatures in the first partial chamber 2 and the second partial chamber 4 even as the temperature in the first partial chamber 4 varies during operation.

Under the control of the temperature control and regulating unit 7E, the heaters 7B or 7C are actuated in order to slightly pre-warm the portion of the container 1 enclosed within the temperature regulating arrangement 7 to a temperature that is slightly warmer than the temperature of the liquid medium 2', even before filling the liquid medium 2' into the first chamber 2 of the container 1. Then, the temperature regulating arrangement 7E continues to operate the heaters to maintain the temperature of the portion of the container 1 enclosing the second chamber 4 at a temperature that is slightly higher, for example in the range of 1° C. to 5° C. or preferably about 3° C. higher, than the temperature of the liquid medium 2' in the first chamber 2 of the container 1.

Since the polymeric material of the membrane 3 is not perfectly impermeable to vapors of the liquid medium 2' contained in the first partial chamber 2, it is not possible to completely prevent the permeation over time of liquid vapors through the membrane 3 from the first partial chamber 2 into the second partial chamber 4. However, with the present inventive apparatus, the liquid medium 2 is the coldest element or location of the system, and due to the temperature dependence of vapor pressure, the first partial chamber 2 is therefore the location having the lowest partial pressure of the liquid vapors in the system. On the other hand, when the liquid vapors permeate through the polymeric membrane 3 into the second partial chamber 4, they take on or exhibit the vapor partial pressure that is prescribed by the temperature prevailing in the second partial chamber 4.

The temperature of the gaseous pressure medium 4' present in the second partial chamber 4 is constantly held at the regulated temperature value slightly above, e.g. 3° C. above, the temperature of the liquid medium 2' in the first partial chamber 2, and thereby is also maintained above the equilibrium value of the vapor pressure curve. Thus, it is practically ensured that condensation of the liquid vapors that permeated through the membrane 3 into the second partial chamber 4 cannot occur. The partial vapor pressure of the liquid vapors permeating into the second partial chamber 4 keeps increasing as the permeation of liquid vapors through the membrane 3 continues, since there is no condensation mechanism operating to reduce the vapor pressure by shedding out liquid. As a result, the increasing vapor pressure in the second partial chamber 4 thereby reduces and then eliminates the pressure gradient that tends to drive the permeation of the liquid vapors through the membrane 3. Ultimately, the permeation of liquid vapors through the membrane 3 comes to a halt when equilibrium is established. Thus, the loss of the liquid medium 2' out of the first partial chamber 2 and into the second partial chamber 4 is limited so that there is practically no noticeable loss of the liquid medium.

In order to prevent condensation of the liquid vapors on the second surface 3B of the membrane 3 facing and bounding the second partial chamber 4, and for achieving the above described advantageous effect, it is especially important that the temperature regulating arrangement 7 establishes a surface temperature of the second surface 3B of the membrane 3 that is slightly higher (e.g. 1 to 5° C.) than that of the first surface 3A on the liquid side of the membrane 3. The temperature on the gas side surface 3B of the membrane 3 is influenced by the temperature of the overall gas side second chamber 4 as well as the temperature of the liquid medium 2' in the first partial chamber 2, dependent on well known heat transport mechanisms. For example, the temperature of the gas side surface 3B is established as an equilibrium between convective and radiant heating of the gas side surface 3B of the membrane 3 from the heated second partial chamber 4, as well as thermal conduction through the membrane 3 from the gas side surface 3B to the liquid side surface 3A and heat transfer between the liquid side surface 3A and the liquid medium 2'.

In view of the above, it is apparent that the temperature of the gas side surface 3B will be dependent on the thermal conduction properties of the membrane material used for the membrane 3. It is thus further apparent that the necessary temperature difference by which the gas-containing second partial chamber 4 must be warmer than the liquid-containing first partial chamber 2, in order to prevent condensation of the liquid vapors that have permeated through the membrane 3 into the second partial chamber 4, is dependent on the particular material used for the membrane and especially the thermal conductivity of that membrane material. Condensation can already be prevented by establishing a rather small temperature difference, on the order of a few degrees Celsius, e.g. 1 to 5° C., between the gas side surface 3A of the membrane 3 and the liquid-side equilibrium temperature.

Figure 2:
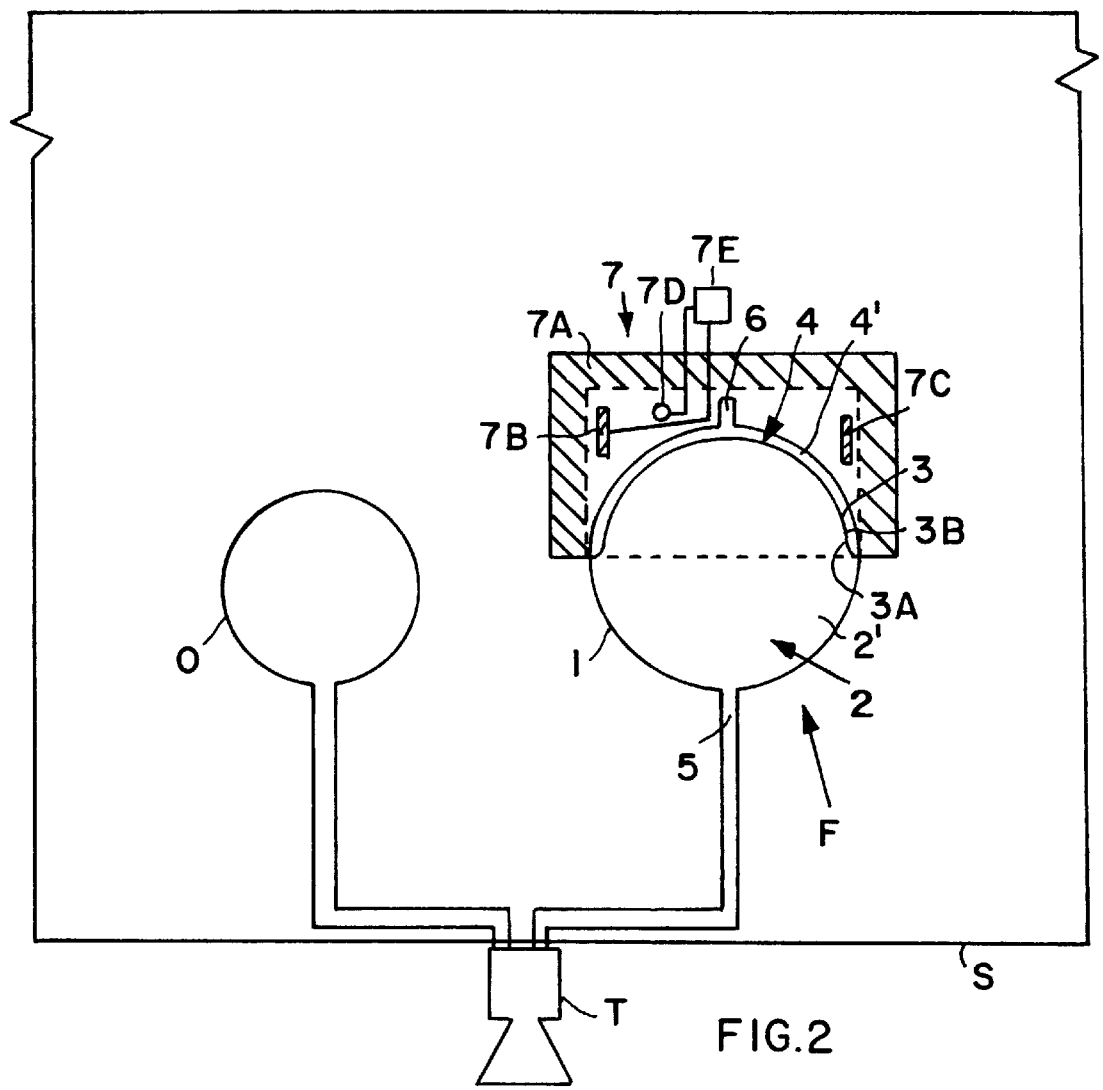
FIG. 2 is a schematic illustration of the present tank and temperature regulating arrangement installed in a spacecraft.

FIG. 2 schematically represents a particular application of the present apparatus. Namely, FIG. 2 shows the liquid storage container 1 and temperature regulating arrangement 7 provided as a fuel tank F in a satellite or orbital space station S. The satellite or space station S further includes a position and attitude adjustment thruster T and an oxidizer tank O, which may incorporate the features of the present inventive arrangement or be a conventional storage tank. It is apparent that FIG. 2 is merely schematic and omits all components of the satellite or space station S other than those essential for understanding the present invention.

In this application, the liquid medium 2' in the storage container 1 is a fuel, and particularly a hydrazine based fuel for powering the attitude and position adjustment thruster T. The oxidizer tank O contains any known oxidizer, and the oxidizer tank O and fuel storage tank 1 are connected to the thruster T by suitable pipes, conduits, or the like. Other components of the fuel delivery system have been omitted in the schematic representation. In order to positively flow the hydrazine-based fuel 2' from the tank 1 to the thruster T, the gaseous pressure medium 4' in this application is an inert gas such as nitrogen or helium that is supplied into the second partial chamber 4 through the gas filling pipe stub 6, from another storage tank and other gas delivery components of the satellite or space station, which are not shown.

The inventive combination of the fuel tank 1 with the temperature regulating arrangement 7 in the spacecraft S as shown in FIG. 2 is operated in the manner described above in connection with FIG. 1, already before filling the hydrazine based fuel 2' into the tank 1, and then during substantially the entire operating life of the satellite or space station S. In this manner, the loss or unuseability of fuel 2' due to its permeation as a vapor through the membrane 3 followed by condensation of the vapor within the second partial chamber 4, is reduced to an absolute minimum, and the extent to which the permeation can occur is also limited. Thereby the amount of useable fuel 2' in the storage tank 1 is maximized.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system storing a liquid medium and a gaseous pressure medium, comprising:
   a liquid medium consisting essentially of one of a rocket fuel and an oxidizer;
   gaseous pressure medium consisting essentially of an inert gas;
   a container enclosing an inner space therein;
   a flexible polymeric divider membrane that is arranged in said container so as to divide said inner space into a first partial chamber that is on a first side of said membrane and that contains said liquid medium therein, and a second partial chamber that is on a second side of said membrane opposite said first side and that contains said gaseous pressure medium therein, wherein said membrane is flexibly displaceable so that respective volumes of said first and second partial chambers are variable and complementary to each other to form a total volume of said inner space of said container, and wherein said membrane is permeable by a vapor of said liquid medium which permeates through said membrane from said first partial chamber into said second partial chamber; and a temperature regulating arrangement including a heater thermally connected to said container and adapted to heat said gaseous pressure medium in said second partial chamber to a second temperature that is higher than a first temperature of said liquid medium in said first partial chamber;

wherein said gaseous pressure medium is always at said second temperature higher than said first temperature of said liquid medium in said first partial chamber, with a temperature difference between said first and second temperatures sufficient to prevent condensation in said second partial chamber of said vapor of said liquid medium that has permeated through said membrane from said first partial chamber into said second partial chamber.

2. The system according to claim 1, wherein said second partial chamber contains said vapor of said liquid medium but does not contain any liquid condensate condensed from said vapor.

3. The system according to claim 1, further in combination with and installed in a spacecraft.

4. The system according to claim 1, wherein said heater of said temperature regulating arrangement comprises an electrical heater arranged so as to heat said second partial chamber.

5. The system according to claim 1, wherein said heater of said temperature regulating arrangement comprises a heat conveying device arranged to convey heat into said second partial chamber.

6. The system according to claim 5, wherein said heat conveying device comprises a heat pipe thermally connected to a portion of said container enclosing said second partial chamber therein.

7. The system according to claim 1, wherein said temperature regulating arrangement further includes a thermal insulation surrounding at least a portion of said container enclosing said second partial chamber therein, and said heater thermally connected with said second partial chamber is surrounded by said thermal insulation.

8. The system according to claim 1, wherein said temperature regulating arrangement further includes a first temperature sensor arranged and adapted to sense said first temperature in said first partial chamber, and a control unit connected for signal transmission with said first temperature sensor and said heater.

9. The system according to claim 8, wherein said temperature regulating arrangement further includes a second temperature sensor arranged and adapted to sense said second temperature in said second partial chamber, and wherein said control unit is further connected for signal transmission with said second temperature sensor.

10. The system according to claim 1, wherein said temperature regulating arrangement further includes a temperature sensor arranged and adapted to sense said second temperature in said second partial chamber, and a control unit connected for signal transmission with said temperature sensor and said heater.

11. The system according to claim 1, wherein said temperature difference between said first and second temperatures amounts to a few degrees Celsius.

12. The system according to claim 1, wherein said temperature difference is in a range from 1° C. to 5° C.

13. A method of operating said system according to claim 1, for minimizing a loss of said liquid medium by permeation of said vapor of said liquid medium from said first partial chamber through said membrane into said second partial chamber, comprising the following steps:

a) introducing said liquid medium into said first partial chamber and introducing said gaseous pressure medium into said second partial chamber; and b) operating said temperature regulating arrangement, beginning no later than a time of beginning said introducing of said liquid medium into said first partial chamber, so as to establish and maintain said second temperature in said gaseous pressure medium in said second partial chamber so that said second temperature is higher by said temperature difference relative to said first temperature already at said time of beginning said introducing of said liquid medium into said first partial chamber.

14. The method according to claim 13, wherein said temperature difference is in a range from 1° C. to 5° C.

15. The method according to claim 13, wherein said temperature difference is 3° C.

16. The method according to claim 13, wherein said first temperature varies due to external influences during operation of said apparatus, and wherein said step of operating said temperature regulating arrangement is carried out to vary said second temperature responsively to said varying of said first temperature so as to maintain said temperature difference.

17. The method according to claim 13, further comprising a preliminary step of operating said temperature regulating arrangement so as to preheat said second partial chamber before said step a).

* * * * *